United States Patent
Boegner et al.

(10) Patent No.: US 7,549,121 B2
(45) Date of Patent: *Jun. 16, 2009

(54) VISUAL WIZARD LAUNCH PAD

(75) Inventors: Marc D. Boegner, San Jose, CA (US); Gordon Andrew Davison, Toronto (CA); Maria Teresa de Jesus Stoll, Oakland, CA (US); Eileen Felicia Kopp, Gilroy, CA (US); Nikolay Markov, Toronto (CA); Debra L. Mayhew, Morgan Hill, CA (US); Daina Pupons Wickham, San Jose, CA (US); Julie Anne Santilli, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 732 days.

This patent is subject to a terminal disclaimer.

(21) Appl. No.: 10/938,969

(22) Filed: Sep. 10, 2004

(65) Prior Publication Data
US 2005/0039194 A1 Feb. 17, 2005

Related U.S. Application Data

(63) Continuation of application No. 09/468,728, filed on Dec. 21, 1999, now Pat. No. 6,833,847.

(51) Int. Cl.
*G06F 3/00* (2006.01)
(52) U.S. Cl. ............... 715/715; 715/711; 715/708; 715/733
(58) Field of Classification Search ........... 715/711, 715/708, 705, 733; 717/109; 719/328
See application file for complete search history.

(56) References Cited

U.S. PATENT DOCUMENTS

| 4,772,206 | A |   | 9/1988  | Kerr et al. ............... 434/118 |
| 5,263,167 | A |   | 11/1993 | Conner, Jr. et al. ........... 707/4 |
| 5,388,993 | A |   | 2/1995  | McKiel et al. ............. 434/118 |
| 5,442,759 | A |   | 8/1995  | Chiang et al. ................ 705/1 |
| 5,539,869 | A |   | 7/1996  | Spoto et al. ............. 715/500.1 |
| 5,581,684 | A | * | 12/1996 | Dudzik et al. ............. 715/708 |
| 5,627,958 | A |   | 5/1997  | Potts et al. ................ 345/708 |
| 5,745,738 | A |   | 4/1998  | Ricard ..................... 703/13 |
| 5,760,771 | A |   | 6/1998  | Blonder et al. ............. 345/854 |
| 5,781,190 | A |   | 7/1998  | Gorbet et al. .............. 345/748 |
| 5,782,642 | A | * | 7/1998  | Goren .................. 434/307 R |
| 6,053,951 | A | * | 4/2000  | McDonald et al. .......... 717/109 |

FOREIGN PATENT DOCUMENTS

JP 6110834 4/1994

OTHER PUBLICATIONS

Wizard setup (publib.boulder.ibm.com).*

* cited by examiner

*Primary Examiner*—William L. Bashore
*Assistant Examiner*—Sherrod Keaton
(74) *Attorney, Agent, or Firm*—Sawyer Law Group LLP

(57) ABSTRACT

A method for interfacing with a plurality of wizards in a computer system. The method includes providing the plurality of wizards organized into groups; providing a launch button on a launch pad, wherein the launch button is associated with at least one wizard, wherein selection of the launch button executes the at least one wizard; providing information pertaining to the at least one wizard when a pointer is positioned over the launch button. The method further includes providing a high-level visual overview of a process corresponding to the plurality of wizards to assist a user when the user may not be familiar with the process before the user selects the launch button to execute the at least one wizard, wherein the high-level overview comprises a relationship between the at least one wizard and other wizards on the computer system.

3 Claims, 16 Drawing Sheets

VISUAL WIZARD LAUNCH PAD

CROSS-REFERENCE TO RELATED APPLICATIONS

The present application is a continuation of U.S. Ser. No. 09/468,728, entitled "Visual Wizard Launch Pad," filed Dec. 21, 1999 now U.S. Pat. No. 6,833,847.

FIELD OF THE INVENTION

The present invention relates to computer systems, and more particularly to graphical user interfaces in computer systems.

BACKGROUND OF THE INVENTION

Many software applications provide "wizards" to guide and assist users to perform specific tasks through the applications. Several wizards may also exist for each application. FIG. 1 illustrates a conventional workstation or computer which has wizards. Several wizards 102 exist on the computer 104. The user 106 must know which of the wizards 102 to execute to perform a particular function. However, frequently several tasks, each with its own wizard, must be executed in order to perform the function. In this situation, the user 106 must know which wizards 102 to execute, how the wizards 102 relate to each other, and in which order the wizards 102 are to be executed in order to perform the function properly.

For example, assume that the user 106 wishes to replicate data in a database system. In order to do so, the user 106 need to perform four tasks: setup, define the source, define the subscription, and capture or apply. Assume also that there is a wizard 102 for each of these tasks. In order to perform the replication, the user 106 must execute the setup wizard, the define source wizard, the define subscription wizard, and the capture/apply wizard, in this order. However, the user 106 may be a novice or unfamiliar with the database system, or may be dealing with a complex database system. Thus, the user 106 may not understand the system enough to know which wizards 102 to execute and when. The user 106 may not even know what wizards 102 exist to help him/her perform the replication function. The user 106 must then expend time and energy to learn or discover how to use the wizards. This leads to a high risk of mistakes and a loss of productivity which increases costs to the database owner.

Accordingly, there exists a need for a method for providing an improved interface between a user and wizards in a computer system. The present invention addresses such a need.

SUMMARY OF THE INVENTION

The present invention provides a method for interfacing with a plurality of wizards in a computer system. The method includes providing the plurality of wizards organized into groups; providing a launch button on a launch pad, wherein the launch button is associated with at least one wizard, wherein selection of the launch button executes the at least one wizard; providing information pertaining to the at least one wizard when a pointer is positioned over the launch button. The method further includes providing a high-level visual overview of a process corresponding to the plurality of wizards to assist a user when the user may not be familiar with the process before the user selectes the launch button to execute the at least one wizard, wherein the high-level overview comprises a relationship between the at least one wizard and other wizards on the computer system. The high-level visual overview includes a visual object for toggling between a conceptual view and the how to information, wherein the visual object is a graphical element which represents hardware and/or software elements of an application on the computer system which is affected by an execution of the at least one wizard. The high-level visual overview further comprises, and wherein the hight-level visual overview further includes at least one of: a description of a function of the at least one wizard; an order in which the at least one wizard and the other wizards should be executed; elements of the computer system affected by the at least one wizard; and how to information showing how to use a user interface of an application on the computer system to accomplish a tack, and wherein the how to information comprises at least one of graphics, a sound chip, and a textual description.

DETAILED DESCRIPTION

The present invention provides a method for providing an improved interface between a user and wizards in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides launch pads on the display of a computer system as interactive interfaces between a user and wizards which exist on the computer system. To more particularly describe the features of the present invention, please refer to FIGS. 2 through 6 in conjunction with the discussion below.

Figure 1:
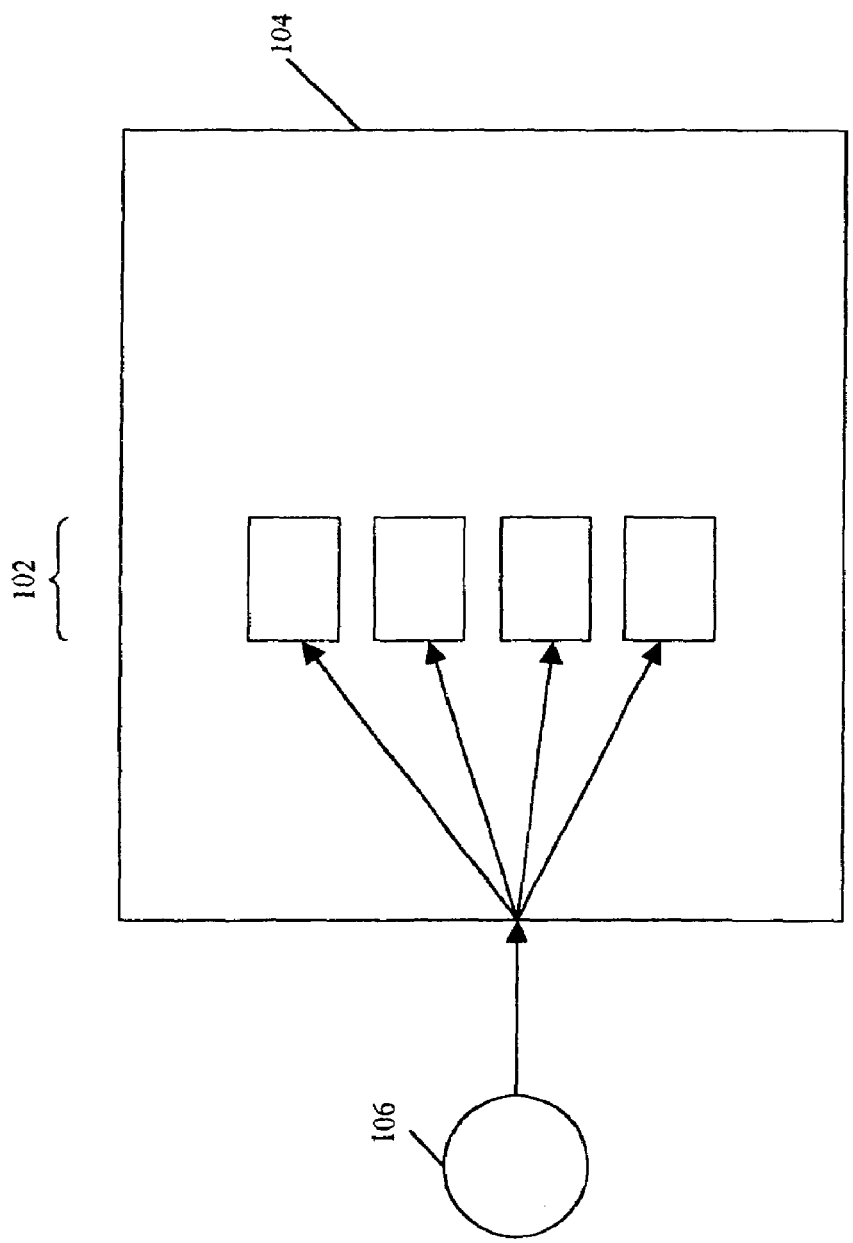
FIG. 1 illustrates a conventional workstation or computer which has wizards.
Figure 2:
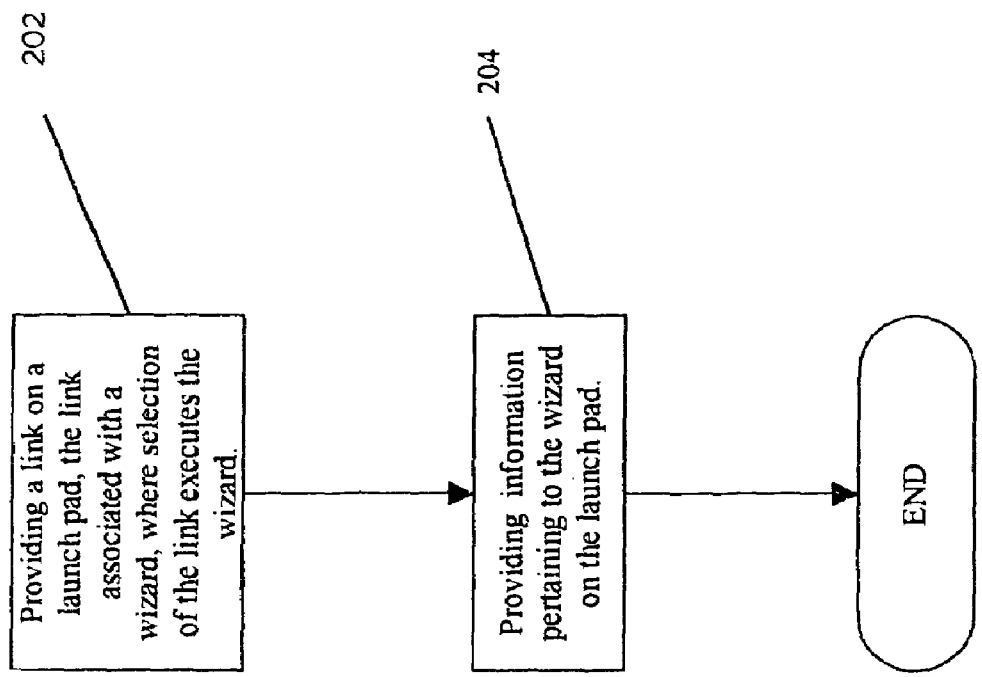
FIG. 2 is a flow chart illustrating a method for providing an interface with wizards in a computer system in accordance with the present invention.

FIG. 2 is a flow chart illustrating a method for providing an interface with wizards in a computer system in accordance with the present invention. First, a link on a launch pad is provided, via step 202. The link is associated with a wizard. Selection of the link would launch or execute the wizard. Then, information pertaining to the wizard is provided on the launch pad, via step 204.

Figure 3:
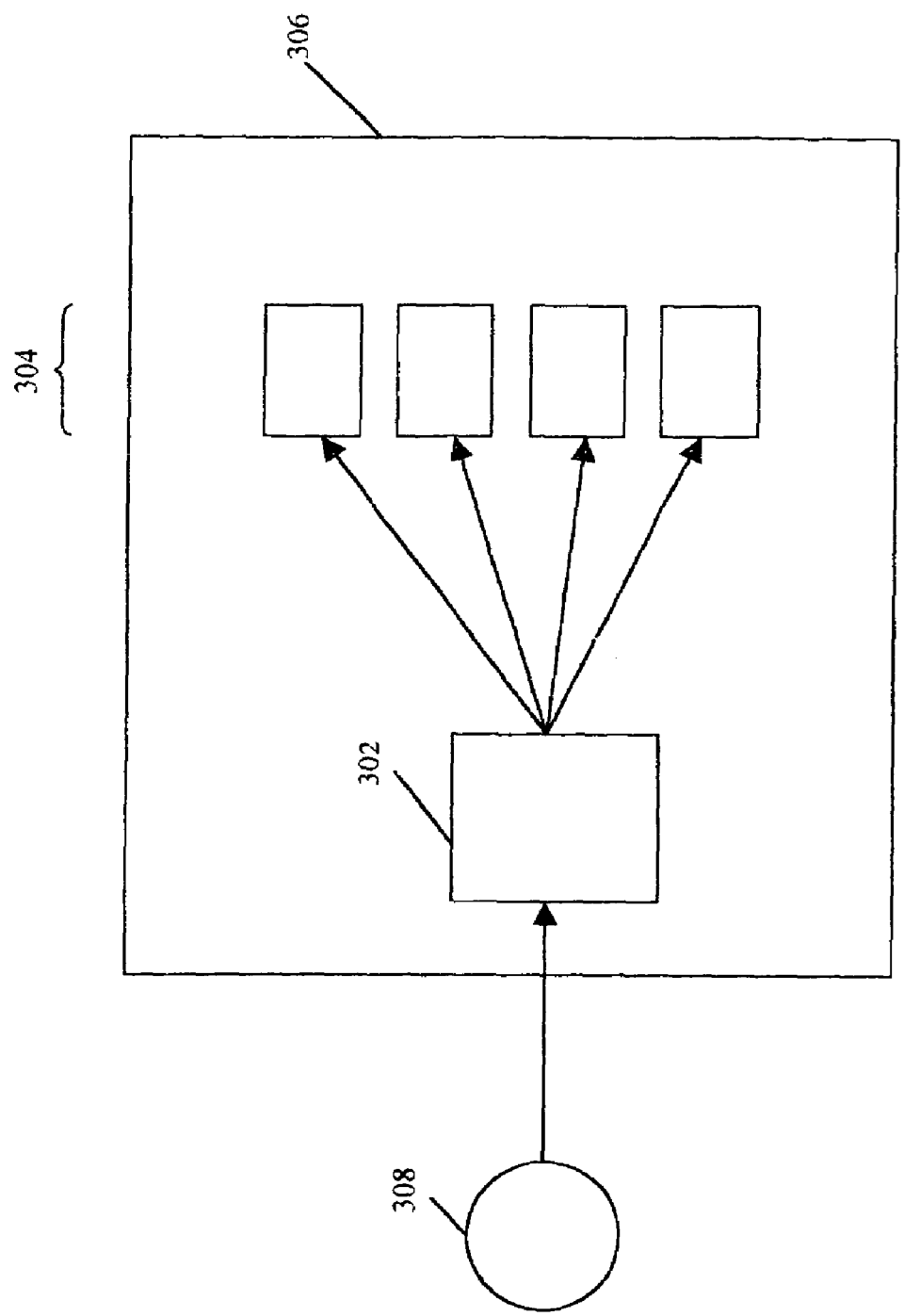
FIG. 3 is a block diagram illustrating a first preferred embodiment of a method for providing an interface with wizards in a computer system in accordance with the present invention.

FIG. 3 is a block diagram illustrating a first preferred embodiment of a method for providing an interface with a plurality of wizards in a computer system in accordance with the present invention. First, links on a launch pad 302 is provided, via step 202. The links on the launch pad 302 link to the plurality of wizards 304 which exist on the computer 306. Computer software may exist on the computer 306 which provides the launch pad 302. But one of ordinary skill in the art will understand that the software may also exist in other places, such as a server, without departing from the spirit and scope of the present invention. When the user 308 interfaces with the launch pad 302, information pertaining to each wizard 304 is provided, via step 204.

In the preferred embodiment, the launch pad 302 is provided when the user initiates an application. The links may be launch buttons, each button being associated with a wizard. The launch buttons allow the user 308 to determine which wizards 304 are available for the application. To obtain a description of a wizard, the user 308 may hover a pointing device, such as a mouse, over the associated launch button. The wizard may then be activated by a mouse click on the launch button. Through the descriptions of the wizards, the user 308 is guided to the correct order in which to execute the wizards 304 and given information as to the effect of each wizard.

FIGS. 4A through 4E illustrate an example launch pad in accordance with the present invention. In this example, assume that the user 308 wishes to replicate data in a complex database system. The user 308 initiates the replication application, which in turn initiates the replication launch pad 400, illustrated in FIG. 4A. The replication launch pad 400 comprises a brief description of the replication process 402 and links, or launch buttons 404a-404d. Each launch button 404a-404d links to a wizard which pertains to a task required for data replication. The "Replication Setup" launch button 404a links to the replication setup wizard; the "Define Source" launch button 404b links to the define source wizard; the "Define Subscription" launch button 404c links to the define subscription wizard; and the "Apply/Capture" launch button 404d links to the apply/capture wizard. Although the launch buttons 404a-404d are shown displayed vertically, they may be displayed in any configuration without departing from the spirit and scope of the present invention. With each launch button 404a-404d is a short description of the task which each wizard will help the user 308 perform. The user 308 may obtain more information about each wizard by positioning the mouse pointer over a launch button.

Figure 4A:
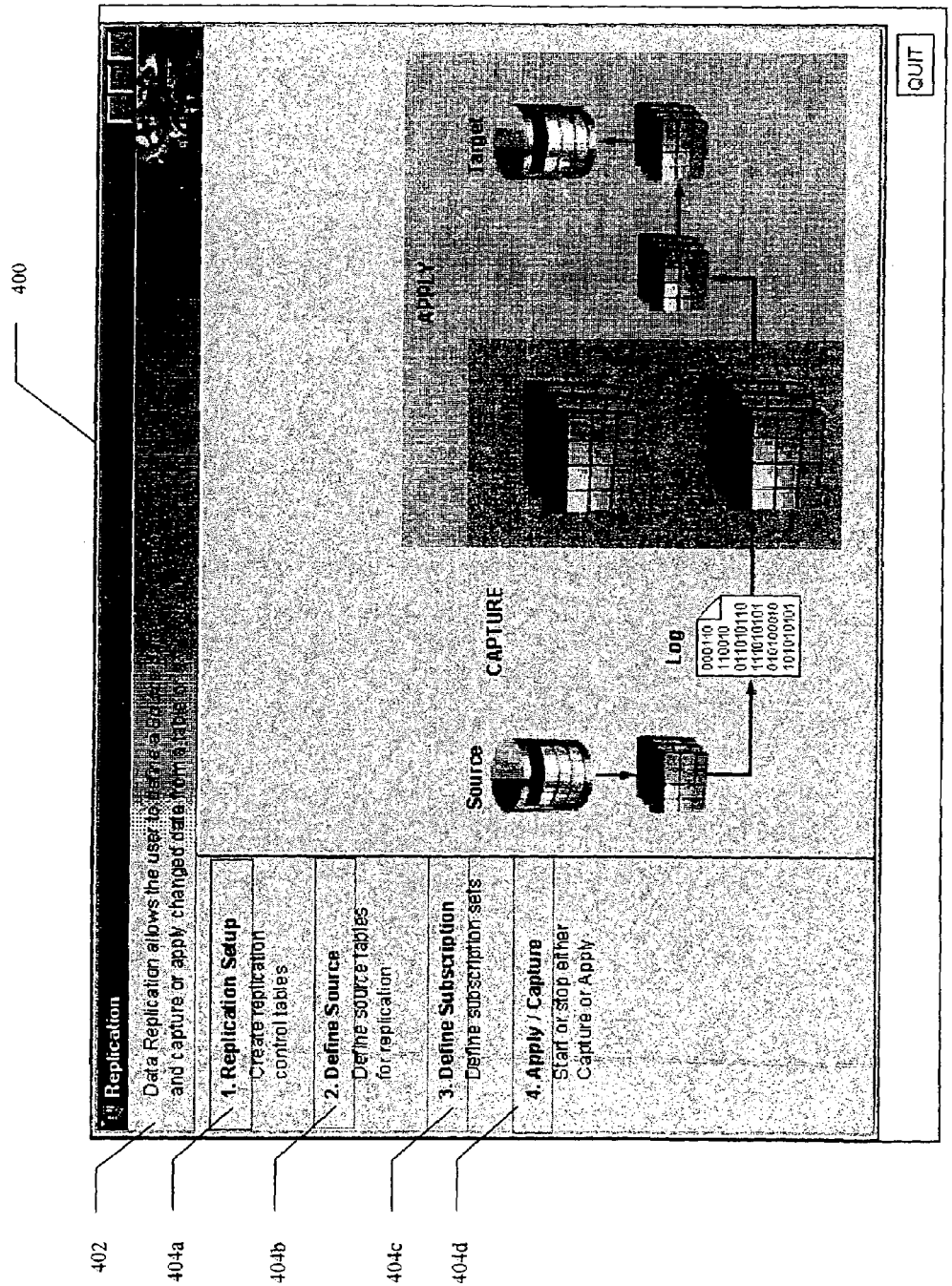
FIGS. 4A through 4E illustrate an example launch pad in accordance with the present invention.
Figure 4B:
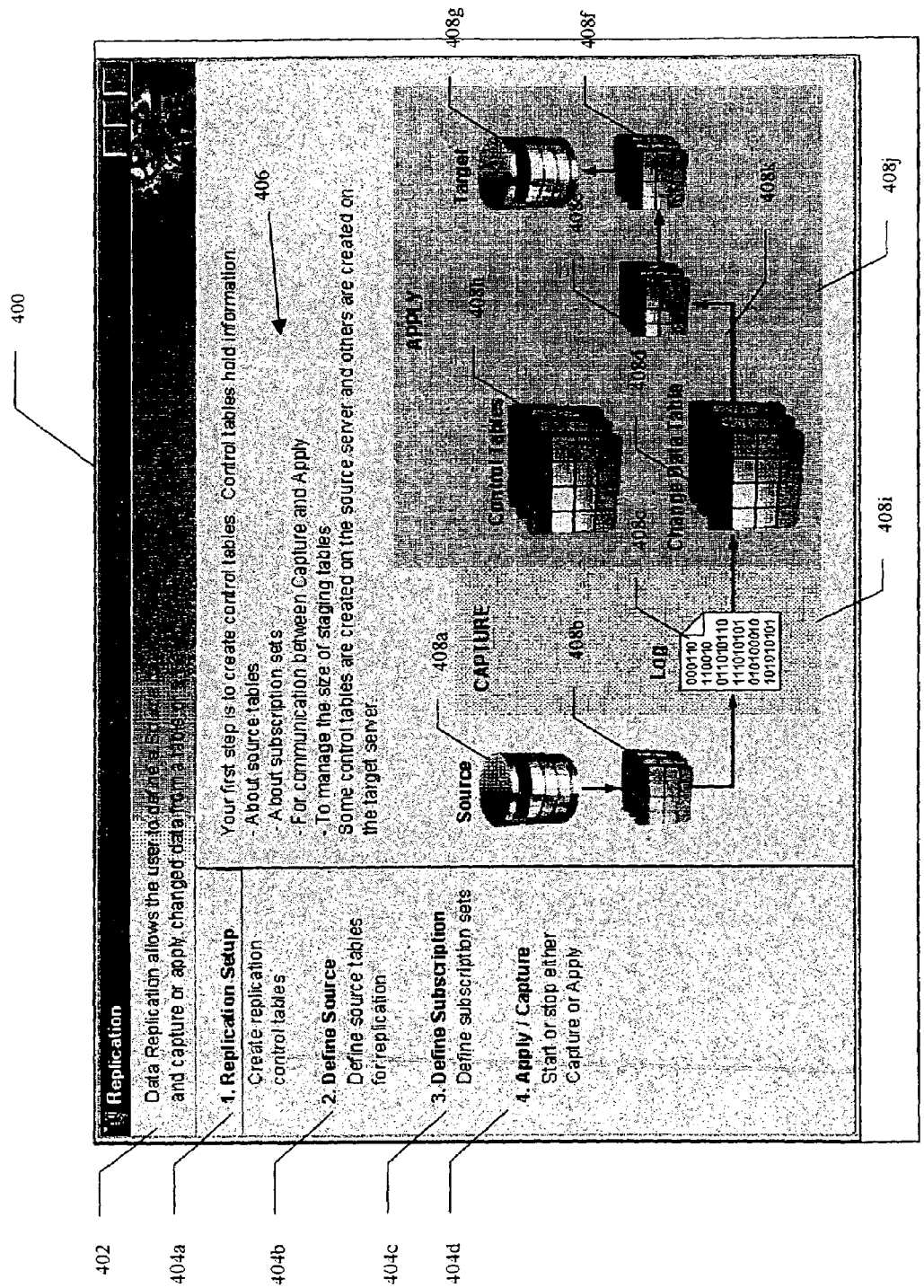

For example, as illustrated in FIG. 4B, the user can position the mouse pointer over the "Replication Setup" button 404a. A brief description 406 of the replication setup wizard appears, explaining the task which this wizard will assist the user 308 to perform, and the effect on the database system. To help the user 308, visual objects 408a-408k may be used to graphically illustrate the effect of the wizard. "Visual objects", as used in this specification, refer to graphical elements which represent hardware and, or software elements of an application affected by the execution of a wizard. In this example, visual objects 408a and 408b represent the source in the database system; visual object 408c represents a log; visual object 408d represents a change data table; visual objects 408e-408g represent the target; and visual object 408h represents the control tables. Visual Object 408i, in the form of a shaded area, illustrates the elements in the database system which is affected by the capture process, i.e., the log 408c, change data table 408d, and control tables 408h. The visual object 408j, in the form of another shaded area, illustrates the elements in the database system which is affected by the apply process, i.e., the change data table 408d, the target 408e-408g, and the control tables 408h. Visual objects 408k, in the form of arrows, illustrate the process flow or interaction among the affected elements. Thus, in FIG. 4B, in addition to providing the description 406, visual objects 408a, 408c, 408d, 408h, 408i and 408j are highlighted to illustrate that these elements of the database system are affected by the replication setup process.

Figure 4C:
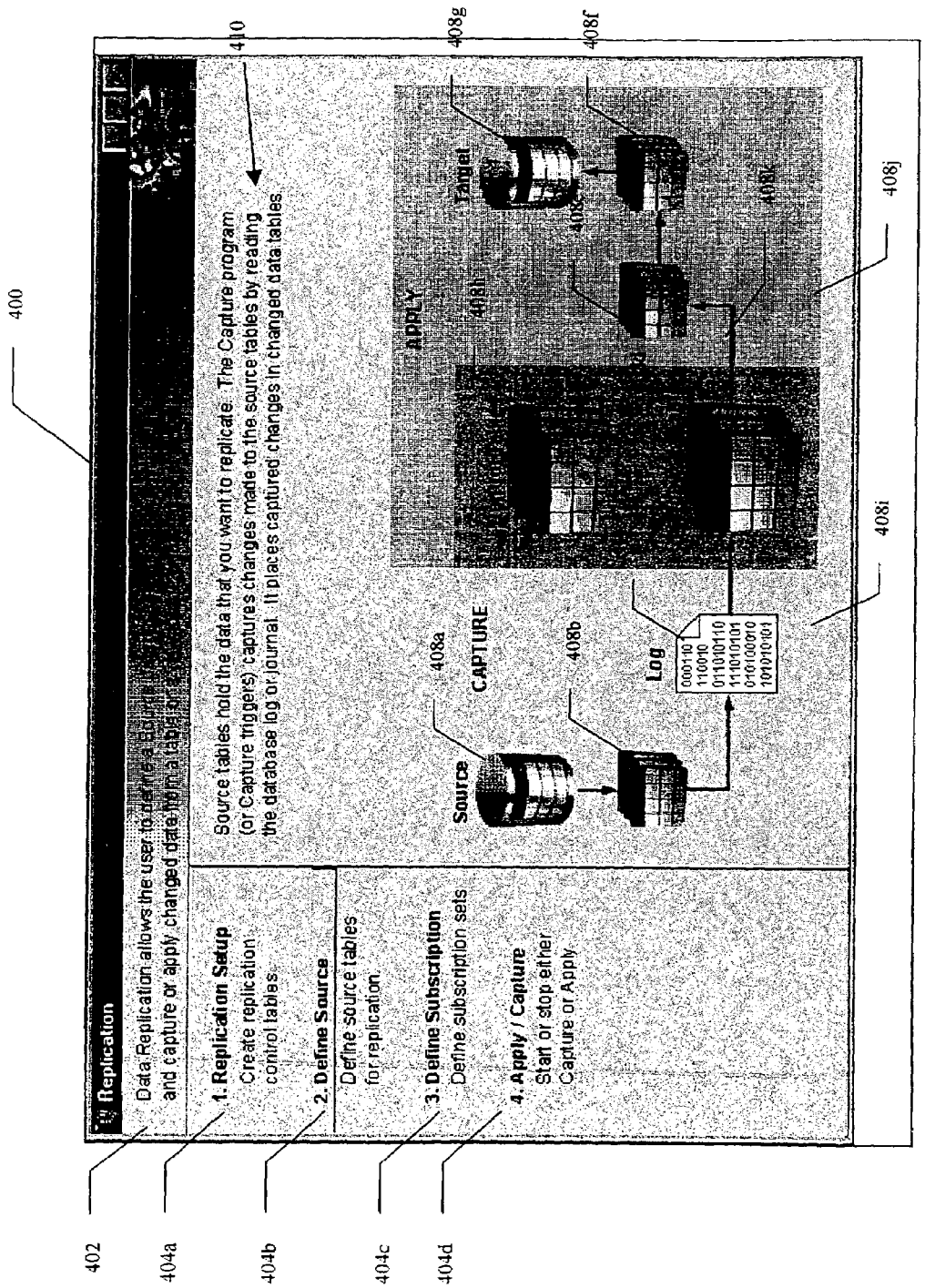
Figure 4D:
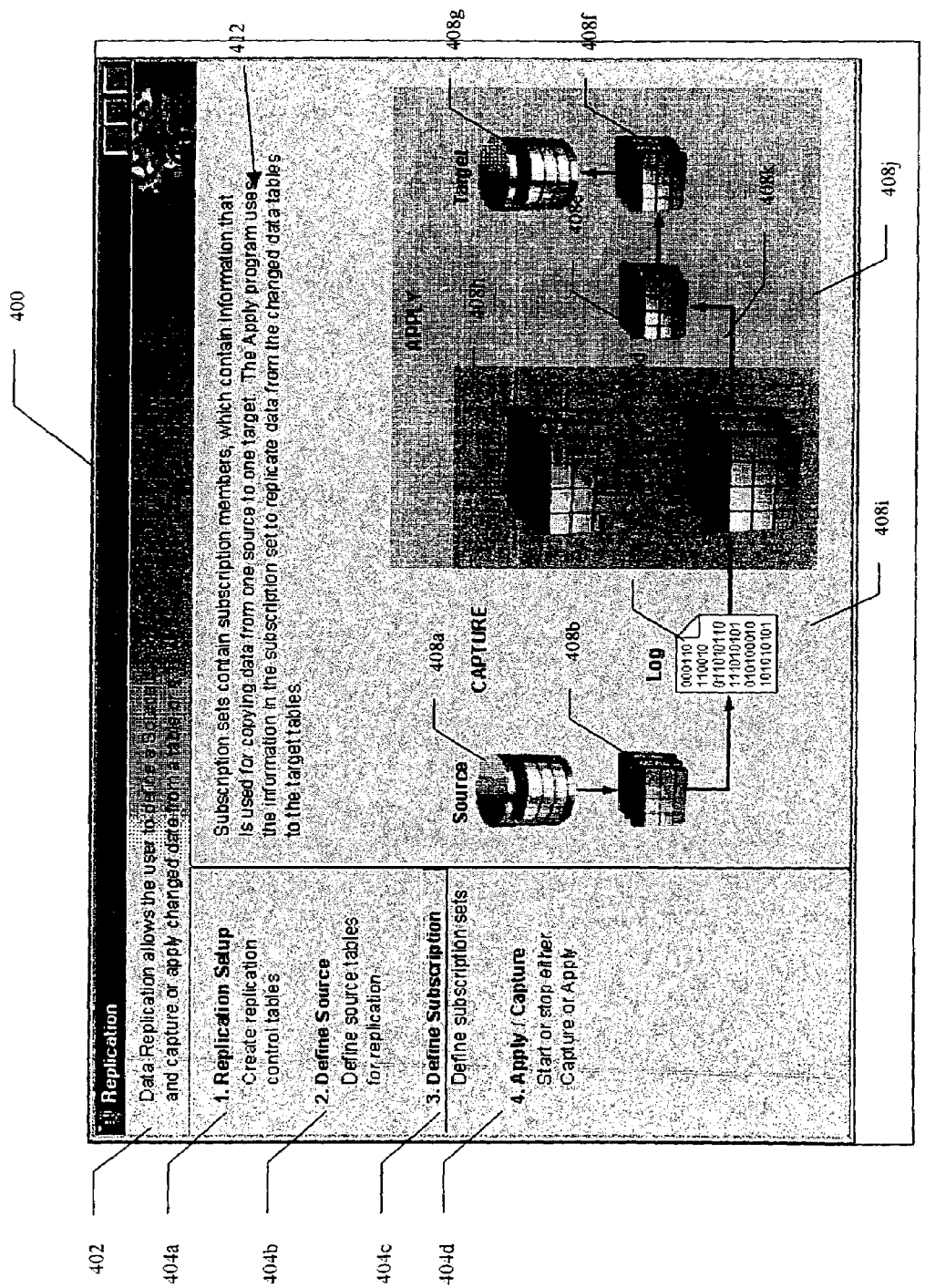
Figure 4E:
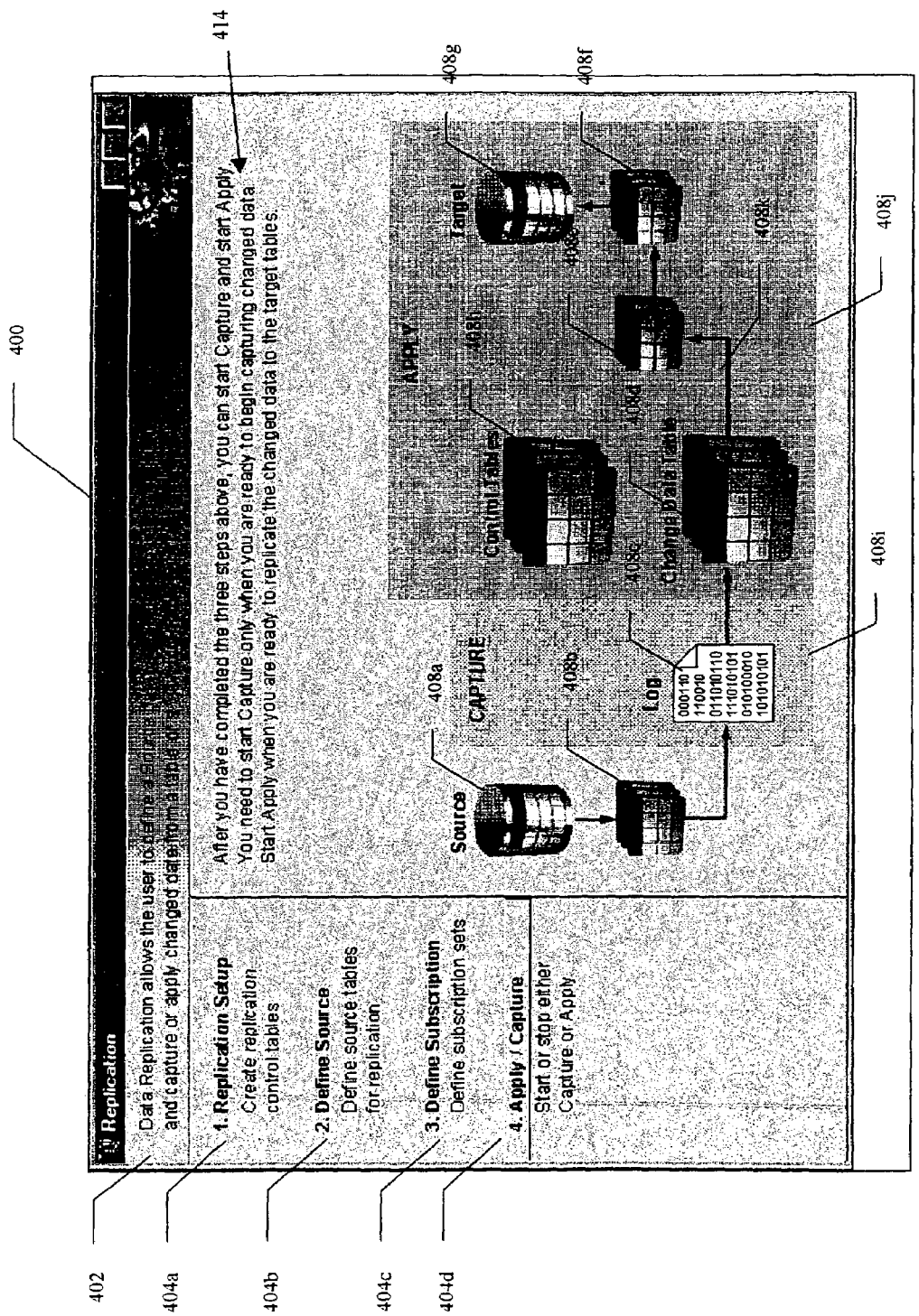

As illustrated in FIG. 4C, when the user 308 positions the pointer over the Define Source launch button 404b, a short description 410 of the define source wizard appears, and visual objects 408a, 408b, and 408j are highlighted. As illustrated in FIG. 4D, when the user 308 positions the pointer over the Define Subscription launch button 404c, a short description 412 of the define subscription wizard appears, and visual objects 408d-408g are highlighted. As illustrated in FIG. 4E, when the user 308 positions the pointer over the Apply/Capture launch button 404d, a short description 414 of the apply/ capture wizard appears, and visual objects 408a-408j are highlighted. To further assist the user 308, the launch buttons 404a-404d are placed in the order in which the wizards should be executed to perform the replication function. The user 308 may then click on the launch buttons 404a-404d to execute the wizards.

As illustrated in FIG. 4A-4E, the launch pad 400 in accordance with the present invention provides the user 308 with the high level concepts pertaining to the function the user 308 is interested in performing. Because the launch pad 400 is interactive in nature, its use is intuitive for the user, which speeds the learning of the high level concepts provided. With the information provided by the launch pad 400, the user 308 knows which wizards are available for a particular function, the order in which these wizards should be executed, how each wizard relates to the others, and what system elements are affected by each wizard. The user 308 may perform the function more quickly and with less mistakes, boosting his/ her productivity.

Although the present invention is described in the context of a database system, one of ordinary skill in the art will understand that the launch pad provided via the method in accordance with the present invention may be used in any context without departing from the spirit and scope of the present invention. Although the present invention is described with the illustrated visual objects, one of ordinary skill in the art will understand that other visual objects may be used without departing from the spirit and scope of the present invention. For example, instead of using shaded areas to indicate affected elements of the system, other types of indicators may be used, including animated visual objects.

Additional objects may be provided in the launch pad to help a user understand the low level steps involved in a task associated with a wizard in accordance with the present invention. For purposes of this discussion, these objects will be referred to as "how to" information. In the preferred embodiment, the "how to" information are screen grabs of the user interface that show the user how to use the regular user interface of an application (not the launch pad) in order to accomplish the low level task. However, "how to" information may also be any other type of object, such as a sound clip or a textual description. When the user positions the mouse over the launch buttons, the graphic changes to give the user information about the low level task to be performed. A button or toggle may be used to change between the launch pad view illustrated in FIGS. 4A-4E, referred to herein as the conceptual view, and the "how to" information.

Figure 5A:
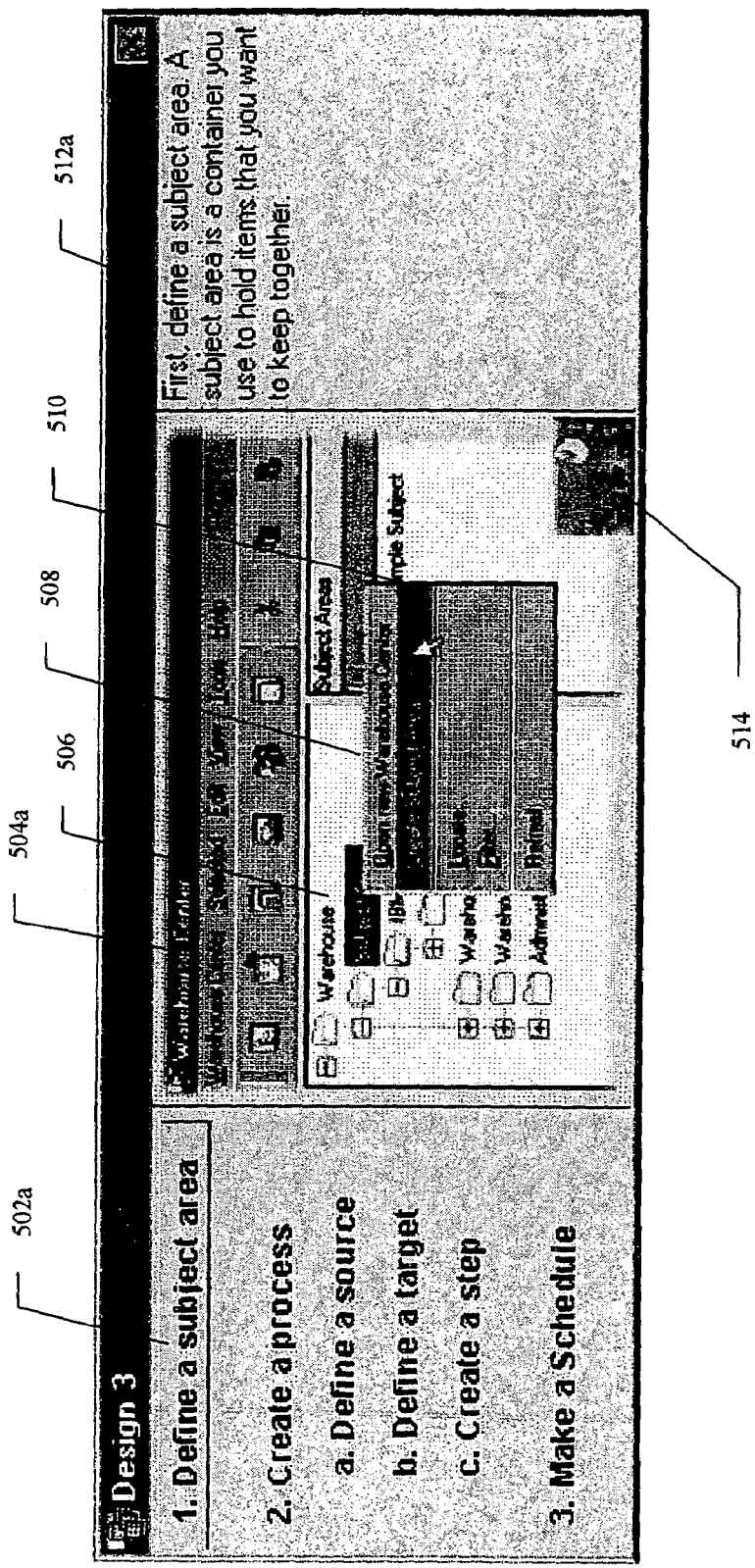
FIGS. 5A through 5F illustrate an example launch pad with "how to" graphics in accordance with the present invention.
Figure 5B:
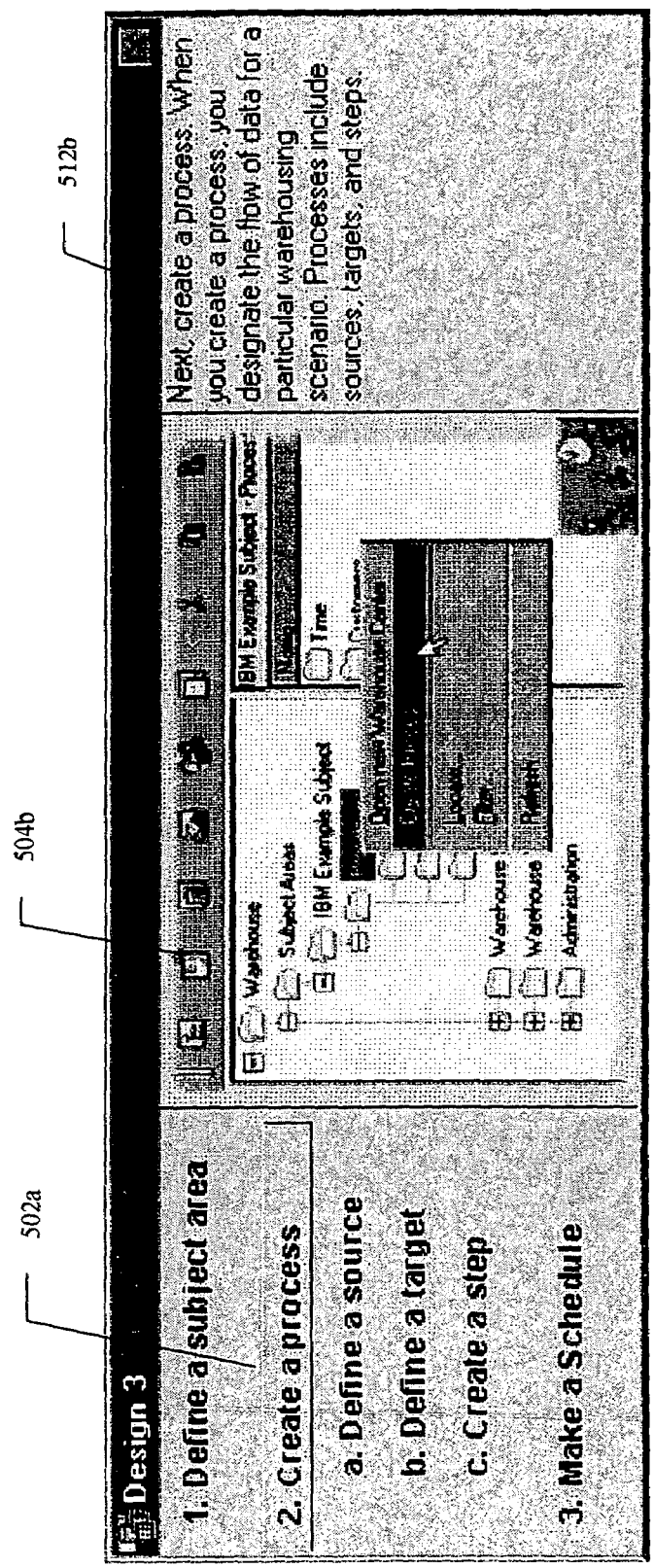
Figure 5C:
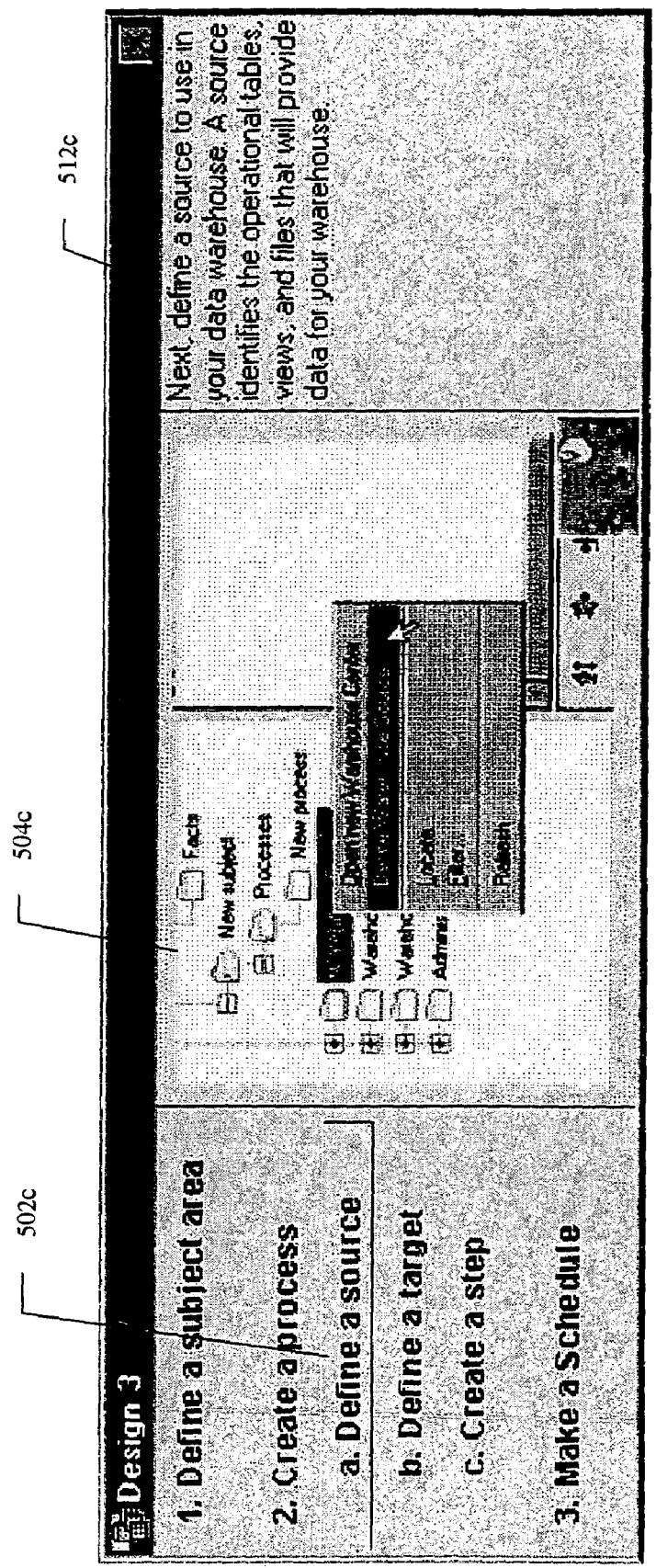
Figure 5D:
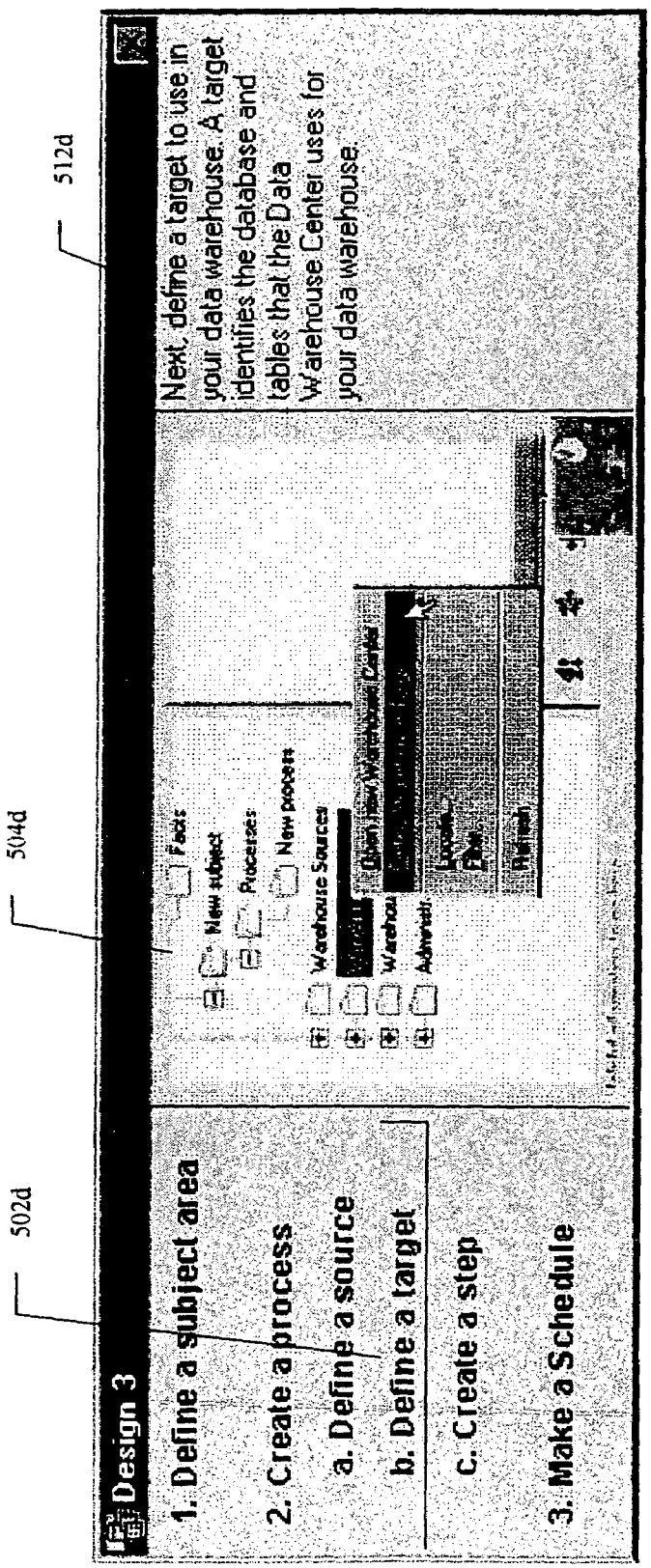

FIGS. 5A-5E illustrate an example launch pad with "how to" information in accordance with the present invention. As illustrated in FIG. 5A, the user can position the mouse pointer over the "Define a subject area" button 502a. The "how to" information 504a are then shown. These information indicate to the user that in order to define a subject area, the user must select the "subject Area" folder 506, bring up the context menu 508 for the folder 506, and click on the "Create Subject Area" option 510. Text 512a may also be shown to further describe the low level task. In the preferred embodiment, a thumbnail 514 of the conceptual launch pad view is provided, where when the user selects the thumbnail 514, the launch pad returns the user to the conceptual view. Other methods may be used to change between the conceptual and the "how to" view, such as a toggle button.

Figure 5E:
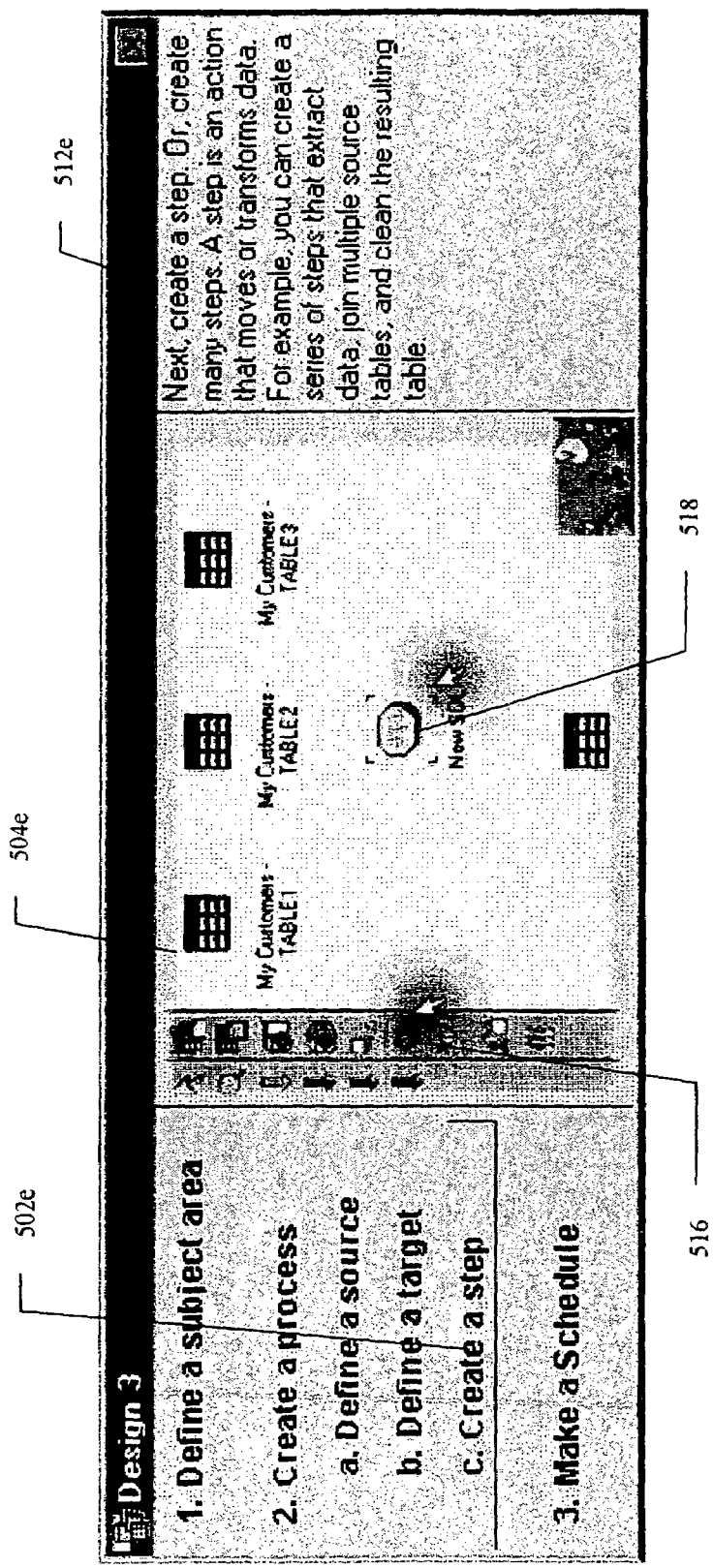
Figure 5F:
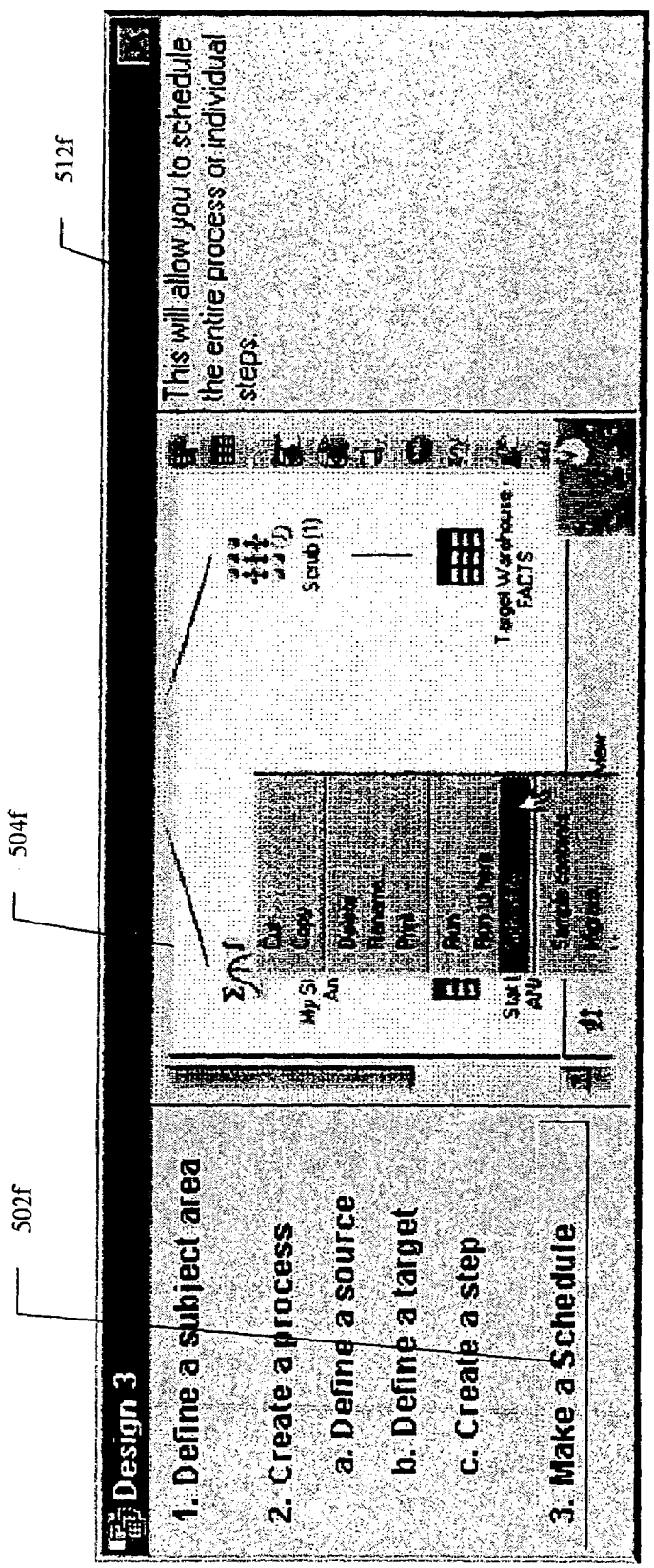

Similarly, as illustrated in FIGS. 5B-5F, the user can also position the mouse pointer over the other buttons 502b-502f, which will show the respective "how to" information 504b-f and their text 512b-512f. Any type of objects may be used as "how to" information. For example, as illustrated in FIG. 5E, "how to" information can show the movement of an object 516 from a toolbar to a modeling canvas 518.

Although the preferred embodiment is described as toggling the user between the conceptual view and the "how to" information, one of ordinary skill in the art will understand that they may be displayed in other configurations without departing from the spirit and scope of the present invention. For example, both views may be displayed simultaneously in the same or separate window.

Figure 6:
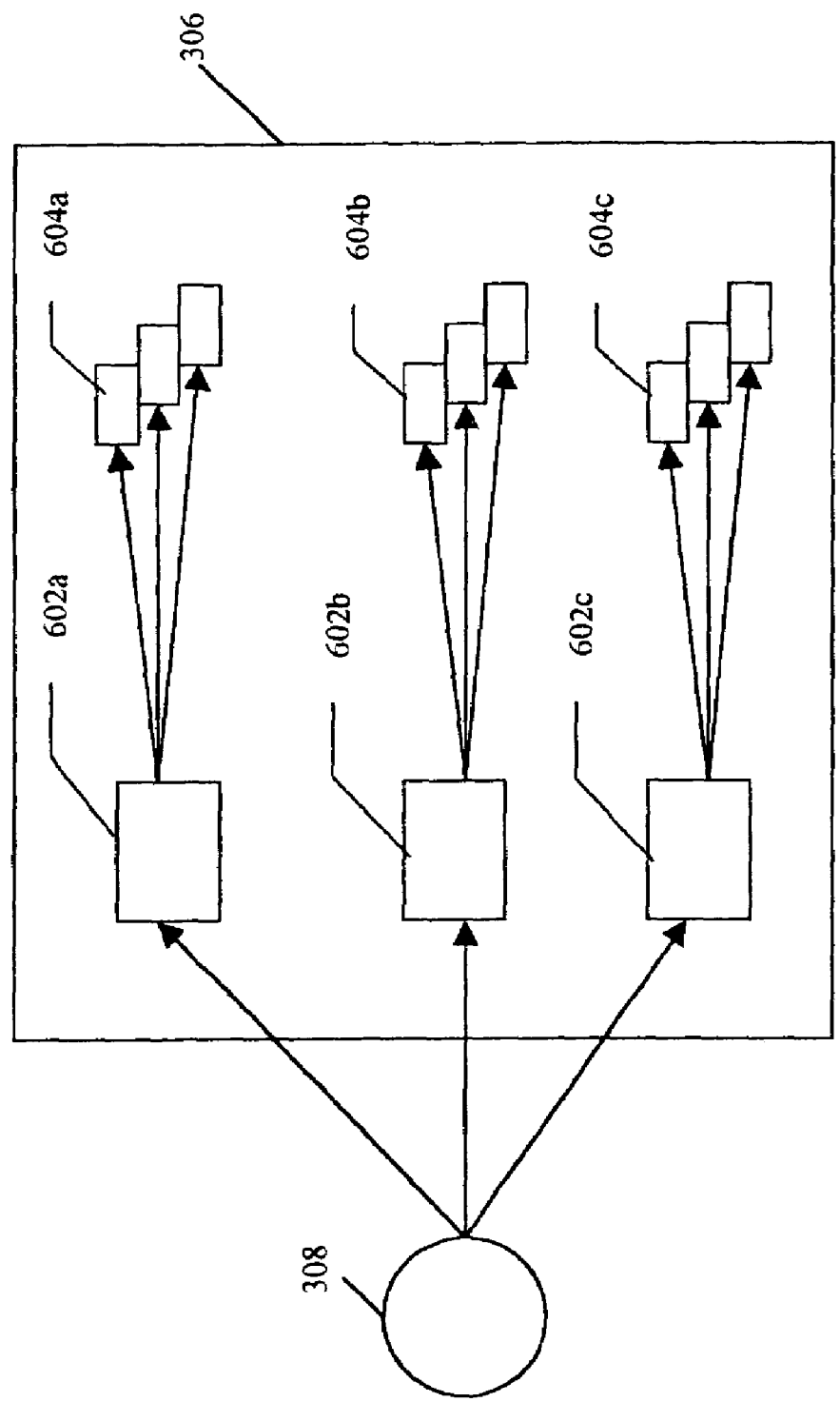
FIG. 6 is a block diagram illustrating a second preferred embodiment of a method for providing an interface with wizards in a computer system in accordance with the present invention.

FIG. 6 is a block diagram illustrating a second preferred embodiment of a method for providing an interface with wizards in a computer system in accordance with the present invention. In this embodiment, the wizards available on the computer 606 are organized into groups 604a-604c based upon a predetermined criteria, such as function. A plurality of launch pads 602a-602c are used to link to each group 604a-604c of wizards. For example, the group 604a may be wizards which pertain to the process of creating a new database in the system, the group 604b may be wizards which pertain to the process of data replication, and the group 604c may be wizards which pertain to the deletion of records from a database in the database system. In this embodiment, when the user 308 initiates one of the processes, the corresponding launch pad 602a, 602b, or 602c, is in turn initiated. The user 308 may be then interact with each launch pad 602a-602c in the same manner as described above.

Figure 7:
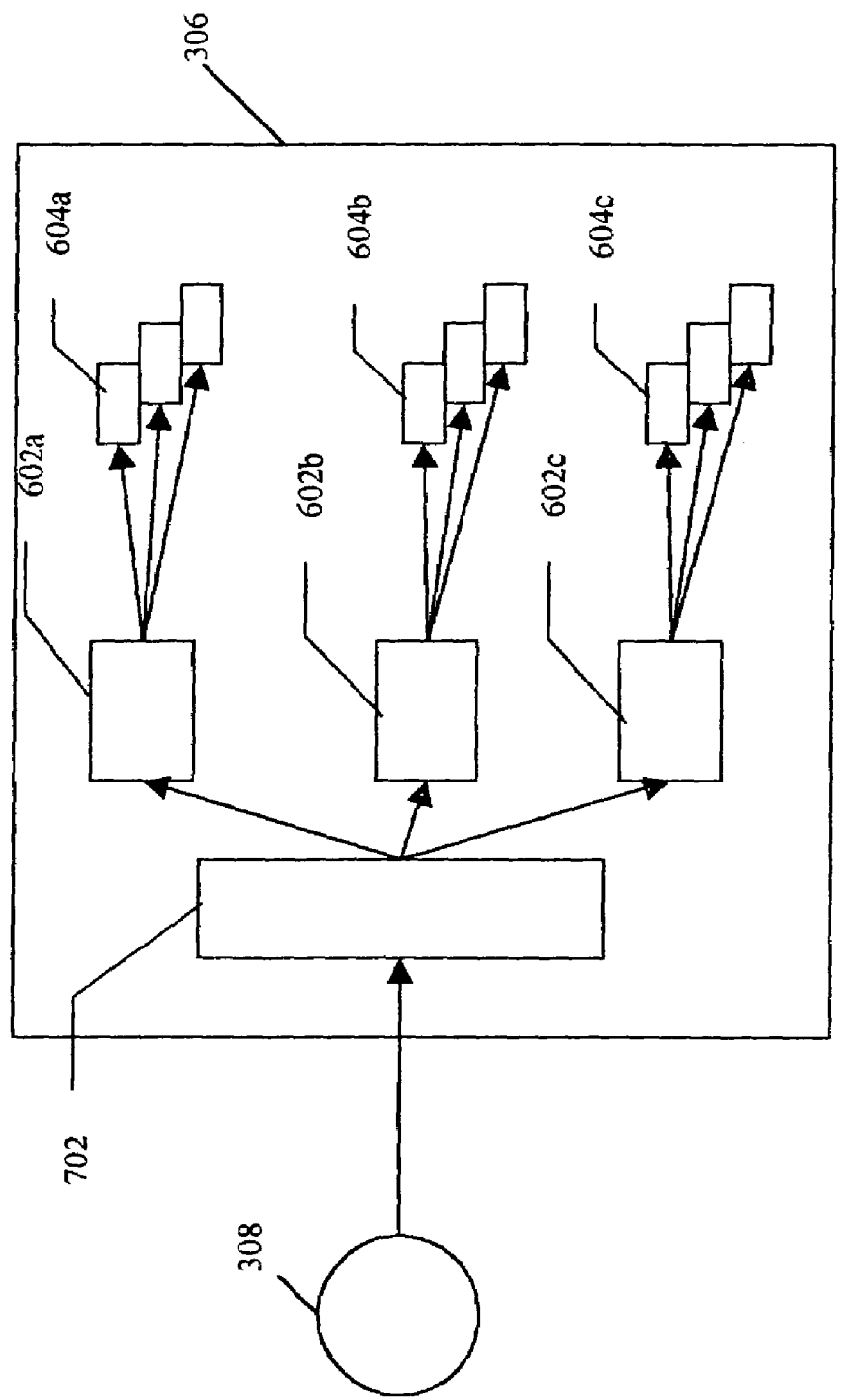
FIG. 7 is a block diagram illustrating a third preferred embodiment of a method for providing an interface with wizards in a computer system in accordance with the present invention.

FIG. 7 is a block diagram illustrating a third preferred embodiment of a method for providing an interface with wizards in a computer system in accordance with the present invention. In this embodiment, a main menu 702 of launch pads is provided to the user 308 with which the user 308 may select the function-specific launch pad 602a-602c.

The launch pads provided to the user 308 may be predefined. However, to provide flexibility, a toolkit may be provided as well to enable developers to build their own launch pads.

A method for providing an interface with wizards in a computer system has been disclosed. The method in accordance with the present invention provides launch pads as interactive interfaces between a user of a computer system and wizards which exist on the computer system. The launch pads comprise links to wizards available for the performance of a particular task. The user interfaces with the launch pad to obtain information associated with each wizard and also to execute the wizards. The information is provided in the form of text and/or visual objects. The text and visual objects assist the user in understanding the function of each wizard, the relationships between the wizards, and the order in which they should be executed in order to perform the task properly. The user has an overview of the complete process before the execution of each wizard. The user may perform tasks more quickly and with less mistakes, boosting his/her productivity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for interfacing with a plurality of wizards in a computer system, comprising:

providing the plurality of wizards organized into groups;

providing a launch button on a launch pad, wherein the launch button is associated with at least one wizard, wherein selection of the launch button executes the at least one wizard;

providing information pertaining to the at least one wizard when a pointer is positioned over the launch button; and providing a high-level visual overview of a process corresponding to the plurality of wizards to assist a user when the user may not be familiar with the process before the user selects the launch button to execute the at least one wizard, wherein the high-level overview comprises a relationship between the at least one wizard and other wizards on the computer system, wherein the high-level visual overview further comprises:

a visual object for toggling between a conceptual view and the how to information, wherein the visual object is a graphical element which represents hardware and/or software elements of an application on the computer system which is affected by an execution of the at least one wizard, and wherein the high-level visual overview further comprises, and wherein the high-level visual overview further comprises at least one of:

a description of a function of the at least one wizard;

an order in which the at least one wizard and the other wizards should be executed;

elements of the computer system affected by the at least one wizard;

how to information showing how to use a user interface of an application on the computer system to accomplish a task, and wherein the how to information comprises at least one of graphics, a sound chip, and a textual description.

2. The method of claim 1 further comprising:

providing a plurality of launch pads on a display of the computer system; and receiving a selection of one of the plurality of launch pads, wherein the selected launch pad is associated with a group of wizards.

3. The method of claim 1 further comprising:

providing a plurality of launch pads on a display of the computer system;

providing a menu of the plurality of launch pads on the display; and receiving a selection of one of the plurality of launch pads from the menu, wherein the selected launch pad is associated with a group of wizards.

* * * * *